United States Patent [19]
Miyoshi et al.

[11] Patent Number: 6,116,169
[45] Date of Patent: Sep. 12, 2000

[54] HEAT RECOVERY SYSTEM AND POWER GENERATION SYSTEM FOR WASTES

[75] Inventors: Norihisa Miyoshi, Chiba-ken; Shosaku Fujinami, Tokyo; Tetsuhisa Hirose, Tokyo; Masaaki Irie, Tokyo; Kazuo Takano, Tokyo; Takahiro Oshita, Kanagawa-ken, all of Japan

[73] Assignee: Ebara Corporation, Tokyo, Japan

[21] Appl. No.: 09/212,255

[22] Filed: Dec. 16, 1998

Related U.S. Application Data

[62] Division of application No. 08/726,403, Oct. 3, 1996, Pat. No. 5,988,080.

[30] Foreign Application Priority Data

Oct. 3, 1995 [JP] Japan .................................. 7-278243
Jun. 28, 1996 [JP] Japan .................................. 8-187031

[51] Int. Cl.$^7$ .............................. F02G 5/00; F23G 7/00
[52] U.S. Cl. ........................ 110/216; 110/229; 110/245
[58] Field of Search ........................... 60/39.12, 39.182, 60/39.464; 110/216, 229, 245, 343

[56] References Cited

U.S. PATENT DOCUMENTS

| | | |
|---|---|---|
| 4,425,757 | 1/1984 | Heyn et al. . |
| 4,546,603 | 10/1985 | Arakawa et al. . |
| 4,638,629 | 1/1987 | Archer et al. . |
| 4,676,177 | 6/1987 | Engstrom ................................. 110/245 |
| 4,697,413 | 10/1987 | Pohl ........................................ 60/39.464 |
| 4,747,356 | 5/1988 | Beisswenger et al. . |
| 4,771,712 | 9/1988 | Engstrom et al. . |
| 4,882,903 | 11/1989 | Lowry, Jr. et al. . |
| 5,290,327 | 3/1994 | Rossle . |
| 5,345,884 | 9/1994 | Vandycke et al. . |
| 5,425,229 | 6/1995 | van Ackeren et al. . |
| 5,440,873 | 8/1995 | Toda et al. . |
| 5,509,264 | 4/1996 | Ito et al. . |
| 5,513,599 | 5/1996 | Nagato et al. ........................... 60/39.12 |
| 5,540,896 | 7/1996 | Newby . |
| 5,601,788 | 2/1997 | Hyppänen et al. . |
| 5,620,488 | 4/1997 | Hirayama et al. ....................... 110/245 |
| 5,651,321 | 7/1997 | Siniakevith et al. . |

Primary Examiner—Ted Kim
Attorney, Agent, or Firm—Wenderoth, Lind & Ponack, L.L.P.

[57] ABSTRACT

In an improved system for recovering heat from a combustion gas produced by burning wastes, the combustion gas or combustible gas produced by partial burning of the wastes subjected to dust filtration in a temperature range of 450–650° C. at a filtration velocity of 1–5 cm/sec under a pressure of from −5 kPa (gage) to 5 MPa before heat recovery is effected. The dust filtration is preferably performed using a filter medium which may or may not support a denitration catalyst. Heat recovery is preferably effected using a steam superheater. The dust-free gas may partly or wholly be reburnt with or without an auxiliary fuel to a sufficiently high temperature to permit heat recovery. The combustion furnace may be a gasifying furnace which, in turn, may be combined with a melting furnace. If desired, the reburning to a higher temperature may be performed under pressure and the obtained hot combustion gas is supplied to a gas turbine to generate electricity, followed by introduction of the exhaust gas from the gas turbine into a steam superheater for further heat recovery. The system can raise the temperature of superheated steam to a sufficient level to enhance the efficiency of power generation without possibility of corrosion of heat transfer pipes by the combustion gas or combustible gas.

6 Claims, 6 Drawing Sheets

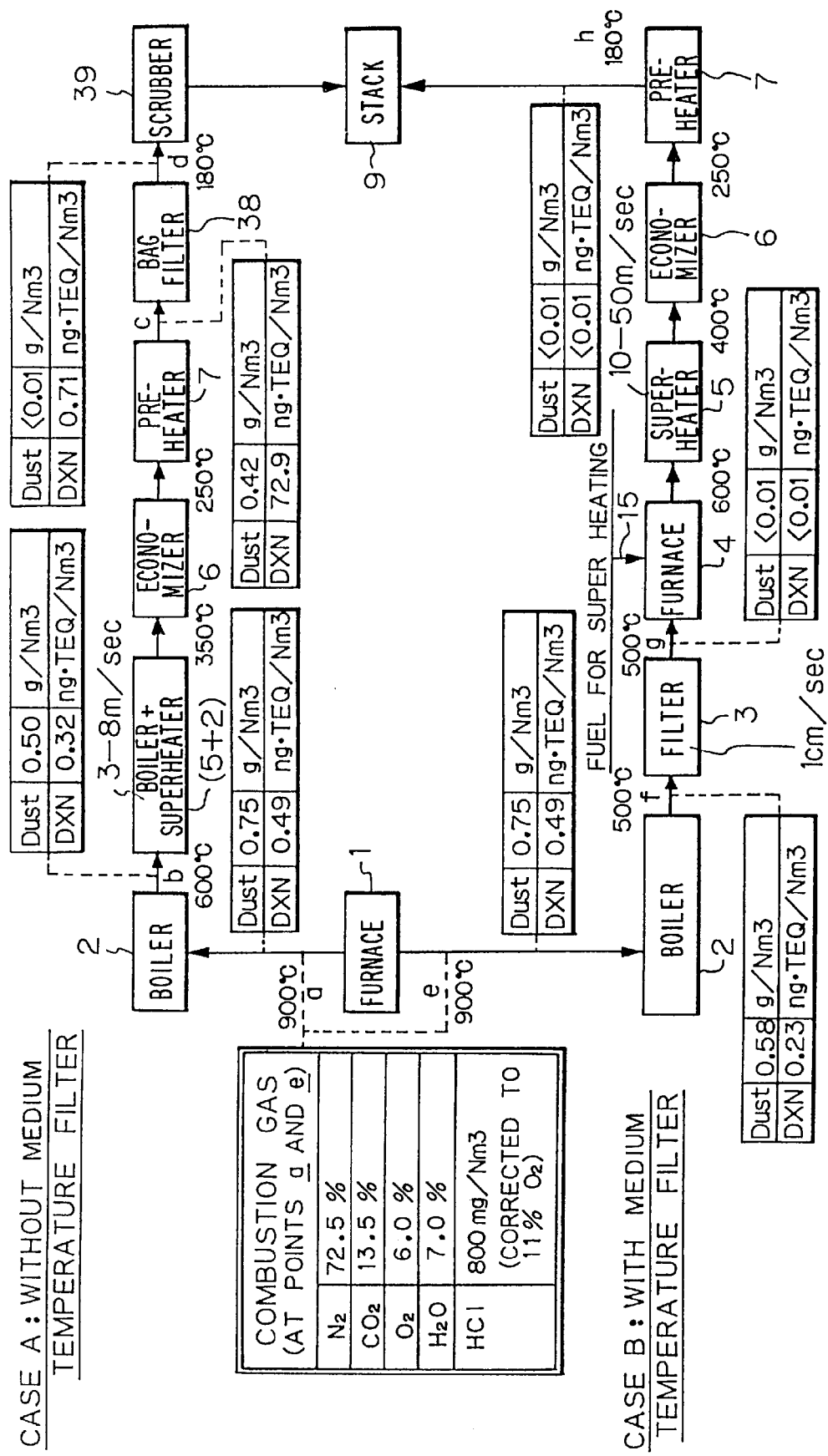

HEAT RECOVERY SYSTEM AND POWER GENERATION SYSTEM FOR WASTES

This is a division of U.S. patent application Ser. No. 08/726,403, filed Oct. 3, 1996, now U.S. Pat. No. 5,988,080.

BACKGROUND OF THE INVENTION

This invention relates to a system for recovering heat from combustion gases or combustible gases produced by partial burning of combustibles. In particular, the invention relates to a heat recovery system that can be applied to the treatment of municipal solid wastes (so-called municipal wastes" or MW) or waste plastics.

The reduction of dioxins and the rendering of soot and dust innocuous are two essential requirements that must be met by recent waste incineration systems. In addition, it has been proposed that new thermal recycling systems be established that can treat wastes not only as materials to be disposed of but also as alternative energy sources.

Advanced power generation systems using municipal wastes have been developed with a view to generating electricity at a higher rate of efficiency than conventional systems in the process of burning solid wastes. According to a modified version of this system that utilizes reburning and superheating, the steam produced in a waste heat boiler is superheated to a higher temperature with a clean hot combustion gas produced by reburning combustion gas from a combustion furnace using high-grade fuel of different origin, for example, kerosine or natural gas. Such an independent superheater is used for the purpose of enhancing the efficiency of power generation with steam turbines. The advanced system of power generation from municipal waste utilizing such superheating method is under active development as being suitable for incineration facilities of a comparatively small scale.

Gases produced in the combustion of municipal wastes generally contain HCl which is generated by the combustion of polyvinyl chloride, and if the surface temperature of heat transfer pipes for heat recovery exceeds about 400° C., corrosion of these pipes due to HCl becomes pronounced. To avoid this problem, the temperature of superheated steam must be held lower than 400° C., but as a result increased efficiency of power generation with steam turbines cannot be achieved.

However, a recent study has revealed that the main cause of corrosion of heat transfer pipes is in fact the deposit of molten salts on the pipes. Municipal wastes have high concentrations of salts such as NaCl (m.p. 800° C.) and KCl (m.p. 776° C.) and, as the combustion proceeds, these salts form a fume and are deposited on the heat transfer pipes, the temperature of which is low. Since this deposit accelerates the corrosion of the heat transfer pipes, the maximum temperature of the superheated steam that can be used in the existing power generation systems using municipal wastes has been about 300° C., which will ensure that the surface temperature of heat transfer pipes can be held below about 320° C.

Table 1 compares the features of various thermal recycling systems. Obviously, for successful high-efficiency power generation and RDF (refuse-derived fuel) power generation, the use of higher-grade materials as heat transfer pipes is not sufficient and conditions preventing the above discussed corrosion problem must first be realized.

TABLE 1

| Power Generating Method | Details | Features | Comments |
| --- | --- | --- | --- |
| Conventional power generation | The heat of combustion is recovered by a waste heat boiler to generate electricity using back pressure steam turbines. | Steam pressure is low because the superheated steam temperature has conventionally been set to a low level. As a result, the power generating efficiency is also low. In recent years, heated steam at a temperature of 400° C. has been attempted. | Once a superheated steam temperature of 400° C. is assured, high steam pressures also will be attained. |
| Highly efficient generation by new material development | New material developments have led to materials for incineration furnaces and superheaters that are resistant to corrosive components such as hydrochloric acid which are generated in the combustion of refuse/wastes. This has led to improvements in steam conditions and enhancement of power generating efficiency. | No additional load on the environment, assist fuel is not required. | The development of materials resistant to molten salt corrosion encounters both technical and economic difficulties. It is therefore more important to create conditions that will avoid corrosion. |
| RDF Power Generation | The addition of lime and the like to the waste material to produce a solid fuel not only has the advantage of helping to prevent putrefaction but also helps to create more favorable steam conditions with a view to achieve a higher level of power generating efficiency by dechlorination and desulfurization. | As it is difficult to generate electricity at a high efficiency in a small-scale plant, only solid refuse material is produced. The RDF is therefore collected for generating electricity at high efficiency in a large-scale plant. | Though hydrochloric acid formation is decreased, the measures against molten salt corrosion are practically at the same level as before. It is therefore necessary to create conditions that will obviate corrosion as described above. |
| Advanced Refuse Power Generation | Combined cycle power generation with gas turbine. Power is generated with a gas turbine, and waste heat from the gas turbine is utilized to superheat the steam from | The most effective practical use is to introduce such a system in large-scale incineration systems. This process requires gas turbine fuel such as natural | The use of large amounts of high quality fuels and the economic feasibility of the process are problems. The key is whether the unit price |

TABLE 1-continued

| Power Generating Method | Details | Features | Comments |
| --- | --- | --- | --- |
|  | the refuse waste heat boiler. By this means, the efficiency of power generation is enhanced. | gas. | of produced electricity is increased. |
| Reburning by use of an Additional Fuel | This is included in an Advanced Refuse Power Generating system. The steam from the waste heat boiler is superheated by using additional separate fuel in order to enhance the power generating efficiency of the steam turbine. | This method offers a high fuel utilization efficiency and is effective in small-scale incineration plants. | The use of large amounts of high quality fuels is expensive. The key is to ensure that the price at which the power sold is greater than the fuel costs. |

The advanced systems of power generation from MW involve huge construction and fuel costs and hence require thorough preliminary evaluation of process economy. Deregulation of electric utilities is a pressing need in Japan but, on the other hand, the selling price of surplus electricity is regulated to be low (particularly at night). Under these circumstances, a dilemma exists in that high-efficiency power generation could increase fuel consumption and the deficit in a resultant corporate balance sheet. Some improvement is necessary from a practical viewpoint. Therefore, what is needed is the creation of an economical and rational power generation system that involves the least increase in construction cost and which also consumes less fuel, namely, a new power generation system that can avoid the corrosion problem.

The mechanism of corrosion is complicated and various factors are involved in the reaction. However, it can at least be said that the key factor in corrosion is not the HCl concentration in the gas, but whether or not NaCl (m.p. 800° C.) and KCl (m.p. 776° C.) are in such an environment that they take the form of a fume (molten mist). These salts are fused to deposit on heat transfer pipes and thereby accelerate corrosion. The molten salts will eventually become complex salts which solidify at temperatures as low as 550–650° C. and their solidification temperatures vary with the composition (or location) of municipal wastes which, in turn, would be influenced by the quantity and composition of the salts.

These are major causes of the difficulties involved in the commercial implementation of advanced or high-efficiency power generation systems using MW.

Table 2 lists representative causes of corrosion and measures for avoiding corrosion.

TABLE 2

| Causes of Corrosion | Corrosion-Preventing Method |
| --- | --- |
| 1. Acceleration of corrosion due to high-temperature exhaust gases | Use of medium-temperature exhaust gas region |
| 2. Chlorine-induced corrosion $FeO + 2HCl \rightarrow FeCl_2 + H_2O$ $Fe_3C \rightarrow 3Fe + C$ $Fe + Cl_2 \rightarrow FeCl_2$ | Creating an environment with low levels of HCl, $Cl_2$ and installing the superheating pipes in such low-chlorine zones |
| 3. CO-induced corrosion CO reacts with protective layers on the heat transfer surfaces with reduction of ferric oxide (making up such layers). | Creating an environment with low CO levels (that is, creating an oxidizing atmosphere) and installing the steam superheater in these low-CO zones. |
| 4. Alkali-containing accretion depositing on the pipe walls | 1. Do not permit adhesion of deposits by wiping the pipe |

TABLE 2-continued

| Causes of Corrosion | Corrosion-Preventing Method |
| --- | --- |
| Acceleration of corrosion due to deposits of alkali metal salts such as sodium and potassium salts. | surface with a flow of fluidizing medium (maintain a weakly fluidized bed). 2. Utilize the heat of the fluidizing medium which has a temperature at which the alkali salts do not melt. 3. Remove dust particles in the exhaust gas having a temperature at which the alkali salts are solidified and remove the chlorine salts (chlorides) and then use the cleaned exhaust gas. |

The utilization of a medium-temperature region of exhaust gases per Table 2, is known to a certain degree. However, a superheated steam temperature of only 400° C. can be recovered from an exhaust gas temperature of about 600° C. at which the salts will solidify. Hence, the method based on heat recovery from exhaust gases would not be commercially applicable to high-efficiency thermal recycling systems unless the problems of corrosion of molten salts is effectively solved.

The methods of avoidance of corrosion which are listed in Table 2 under items 2), 3) and 4-1) and 4-2) are considered to be effective if they are implemented by using an internally circulating fluidized-bed boiler system in which a combustion chamber is separated from a heat recovery chamber by a partition wall.

The internally circulating fluidized-bed boiler system is attractive since "the fluidized beds can be controlled below temperatures at which alkali salts will melt". However, this method is incapable of avoiding the resynthesis of dioxins.

As is well known, dioxins are resynthesized in heat recovery sections. Studies on methods of treating shredder dust and its effective use have established a relationship between residual oxygen concentration and HCl concentration in exhaust gases in fluidized-bed combustion at 800° C. According to reported data, HCl concentration was about 8,000 ppm (almost equivalent to the theoretical) when the residual oxygen concentration was zero, but with increasing residual oxygen concentration HCl concentration decreased sharply until it was less than 1,000 ppm at 11% $O_2$ (at typical conditions of combustion).

"Shredder dust" is a general term for rejects of air classification that is performed to recover valuables from shredded scrap automobiles and the like; shredder dust is thus a mixture of plastics, rubber, glass, textile scrap, etc.

The present inventors conducted a combustion test on shredder dust using a test apparatus of 30 t/d (tons/day) and found that the concentration of HCl was comparable to 1,000 ppm (i.e., similar to the above mentioned study). To investigate the materials balance of the chlorine content, the inventors also analyzed the ash in the bag filter and found that it contained as much as 10.6% chlorine, with Cu taking the form of $CuCl_2$.

With regard to $CuCl_2$, it has been reported that this compound is related to the generation of PCDD/PCDF in the incineration processes and serves as a catalyst for dioxin resynthesis which is several hundred times as potent as other metal chlorides (ISWA 1988 Proceedings of the 5th Int. Solid Wastes Conference, Andersen, L., Möller, J (eds.), Vol. 1, p. 331, Academic Press, London, 1988). Two of the data in such report are cited here and reproduced in FIG. 5, which shows the effect of Cu concentration on the generation of PCDD (o) and PCDF (Δ), and in FIG. 6, which shows the generation of PCDD (o) and PCDF (Δ) in fly ash as a function of carbon content. The report shows that $CuCl_2$ and unburnt carbon are significant influences on the resynthesis of dioxins.

It should be noted that carbon tends to remain unburnt in the incineration process since combustion temperatures cannot be higher than 1,000° C.

SUMMARY OF THE INVENTION

The present invention has been accomplished under these circumstances and has as an object the provision of a heat recovery system and a power generation system that can enhance the efficiency of power generation by sufficiently increasing the temperature of superheated steam without inducing corrosion of heat transfer pipes by combustion gases and which yet is capable of suppressing resynthesis of dioxins in a latter stage.

This object of the invention can be attained by a system for recovering heat from combustion gases produced by complete burning of combustible gases produced by partial burning of wastes, in which either of the gases is subjected to dust removal in a temperature range of 450–650° C. at a filtration velocity of 1–5 cm/sec under a pressure of from –5 kPa (gage) to 5 MPa before heat recovery is effected.

In the heat recovery system, dust removal is preferably performed using a filter medium such as a ceramic filter which may or may not support a denitration catalyst. Heat recovery in the system may be performed using a steam superheater. Thus, in the present invention, not only molten alkali salts which will cause corrosion but also $CaCl_2$ (produced by the reaction $CaO+2HCl \rightarrow CaCl_2+H_2O$) are removed as solidified salts by dust removal in the temperature range of 450–650° C., and this contributes to avoiding corrosion of heat transfer pipes in the superheater by molten salts and HCl. Further, the filter medium which may or may not support a denitration catalyst can also remove CuO and/or $CuCl_2$ which are catalysts for dioxin resynthesis and, hence, the heat recovery system of the invention is also capable of suppressing the resynthesis of dioxins in a latter stage.

In the invention, the combustion gas or combustible gas may be partly or wholly reburnt with or without an auxiliary fuel to a sufficiently high temperature to permit heat recovery. The reburning of the combustible gas may be performed by supplying air or oxygen-enriched air or pure oxygen to the gas. The reburning of the combustion gas with an auxiliary fuel may be performed using the residual oxygen in the combustion gas. The combustible gas may be obtained by partial burning of wastes. The combustible gas may also be obtained by carrying out a gasification reaction in a low temperature fluidized-bed gasification furnace having a fluidized bed temperature of 450–650° C. Thus, according to the present invention, the absence of molten salts contributes to avoiding the corrosion of heat transfer pipes in the superheater which would otherwise occur at an elevated temperature if molten salts were present and, as a result, steam can be superheated to a sufficiently high temperature.

It should be noted that the gasification reaction which proceeds in a reducing atmosphere reaction is not likely to generate CuO. In addition, unburnt carbon will hardly remain if complete combustion is performed at 1,300° C. and above in a melting furnace subsequent to gasification. Therefore, the gasification and melting or slagging combustion system of the invention is the most rational method for suppressing the resynthesis of dioxins.

The object of the invention can also be attained by a heat recovery system and power generation system which is an extension of the above-described gasification and slagging combustion system in that combustion or gasification, dust removal and reburning are performed under pressure and that the combustion gas or combustible having an elevated temperature is supplied to a gas turbine for power generation, followed by the introduction of the exhaust gas from the gas turbine into a steam superheater for heat recovery.

In the heat recovery method of the invention, the temperature of the combustion gas or combustible gas can be lowered to 450–650° C. by collecting heat in a boiler in a conventional manner, with the steam temperature being below 300° C. and the surface temperature of heat transfer pipes being below 320° C. The temperature of superheated steam can be raised to about 400° C. when the gas temperature is below 600° C. If desired, dust removal may be preceded by blowing powder of limestone, calcium oxide, slaked lime or the like into the combustion gas or combustible so that they are reacted with the HCl in the gas. Thus, HCl can be removed sufficiently to ensure that the source of corrosion in the combustion gas is further reduced drastically.

BRIEF DESCRIPTION OF THE DRAWINGS

FIG. 7 is a flow sheet for a test plant, with test data included, that was operated to evaluate the effectiveness of a medium-temperature filter for preventing the corrosion of heat transfer pipes while suppressing the resynthesis of dioxins.

DESCRIPTION OF THE PREFERRED EMBODIMENTS

Figure 1:
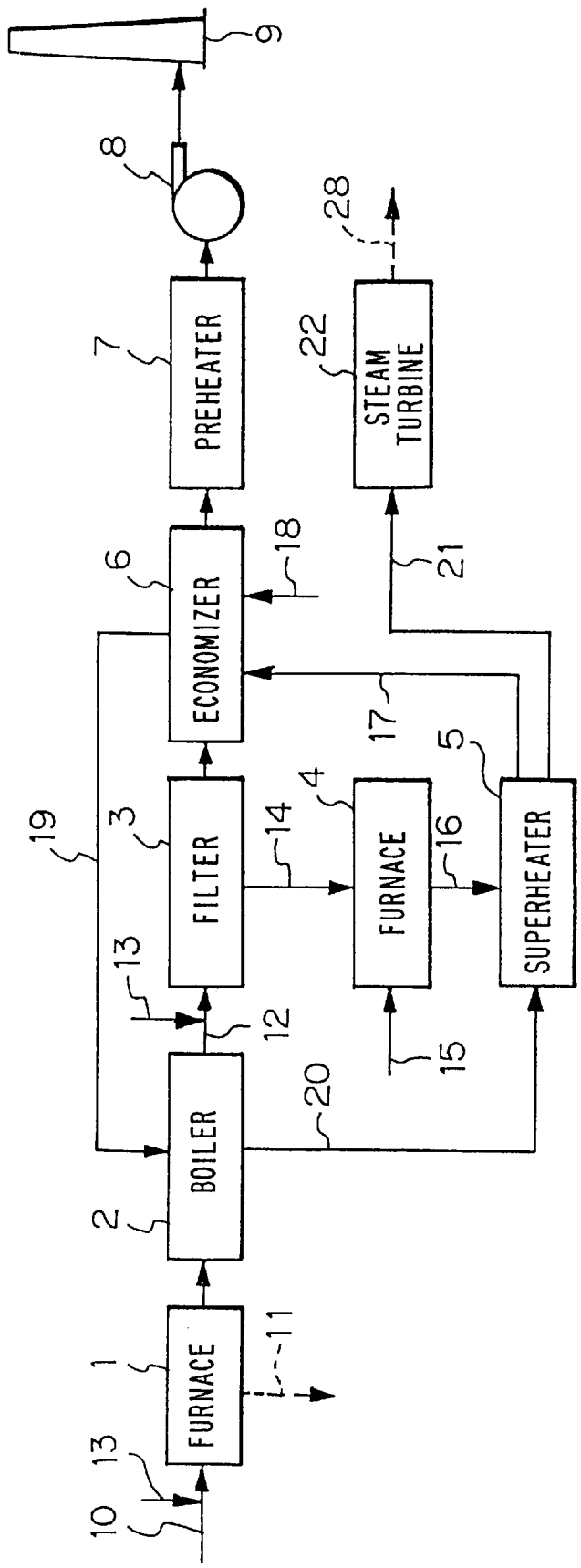
FIG. 1 is a flow sheet for a heat recovery system involving reburning in one embodiment of the invention.

Molten salts including, NaCl (m.p. 800° C.) and KCl (m.p. 776° C.) exist as complex salts and exhibit a strong corrosive action when they are deposited on heat transfer pipes. However, such complex salts are solidified at 550–650° C., so most of such complex salts can be trapped if dust removal is performed at temperatures below the melting points (solidification points) thereof. Therefore, if the combustion gas resulting from the burning of municipal wastes is subjected to dust removal at a temperature lower than the melting points of the complex salts in the combustion gas, the heat transfer pipes installed at a latter stage can be prevented from being corroded by molten salts.

If the temperature of superheated steam is to be increased to 400–500° C. with a view to improving the efficiency of power generation, the temperature of the combustion gas is desirably increased to at least 600° C. or above. Dust-free combustion gas can be used as a high quality heat source since it contains no salts. When the gas is reburnt with an auxiliary fuel such as natural gas by making use of the residual oxygen in the combustion gas, the consumption of the auxiliary fuel is remarkably reduced, as is the amount of resultant exhaust gas, compared with the heretofore proposed method of using an independent reburner and superheater in a power generating system.

The consumption of the auxiliary fuel can be reduced and an increase in the amount of the exhaust gas can be suppressed by limiting the amount of the gas to be reburnt to the necessary minimum amount for superheating steam.

If the content of residual oxygen in the combustion gas is small, combustion air must be added. If oxygen enriched air or pure oxygen is used in place of combustion air, the consumption of the auxiliary fuel can be suppressed and yet the temperature of the combustion gas can be sufficiently increased while preventing an increase in the amount of the exhaust gas that need be treated.

If the waste is gasified under a deficiency of oxygen to produce combustible gas, such gas easily may be reburnt merely by supplying oxygen-containing gas such as air at a later stage instead of using high quality auxiliary fuel, thus partly or completely eliminating the need to use the auxiliary fuel.

If the wastes contain copper (Cu), gasification thereof offers a further benefit because in the reducing atmosphere, copper (Cu) is not likely to form copper oxide (CuO) which is known to function as a catalyst for accelerating dioxin resynthesis. Hence, the potential of dioxin resynthesis in a later stage is reduced. If a fluidized-bed furnace is used in the gasification stage, the occurrence of hot spots can be prevented and operation in the low-temperature range of 450–650° C. can be realized to accomplish a highly effective prevention of copper oxidation.

It should be noted that if the combustible gas has only a low heat value, oxygen enriched air or pure oxygen rather than combustion air may be employed to decrease the consumption of the auxiliary fuel and yet increase the temperature of the gas while suppressing the increase in the amount of the combustion gas to be treated.

It should also be noted that the product gas from the gasifying furnace contains a large amount unburnt solids and tar. If such a gas is directly passed through a filter, clogging may occur due to the unburnt solids and tar. To avoid this problem, part or all of the gas may be burnt in a high temperature furnace provided downstream of the gasification furnace before the gas is passed through the filter, so that the temperature of the gas is elevated to a level that causes decomposition of the unburnt solids and tar in the combustion gas. This is effective in solving filtering problems associated with the unburnt solids and tar. In addition, the combustion gas is heated to a sufficiently high temperature to enable the decomposition of dioxins and other organochlorines in the combustion gas.

If the temperature elevation is performed in a melting furnace such that the produced gas is heated to a temperature level that causes melting of the ash content, the ash can be recovered as molten slag, and at the same time the load on the filter can be reduced.

Another advantage of using a melting furnace is that any copper oxide (CuO) that may be generated in the gasification furnace can be converted to molten slag, thereby further reducing the potential of resynthesis of dioxins in a latter stage.

Ceramic filters are suitable for use as dust filters in the temperature range of 450–650° C. at a filtration velocity of 1–5 cm/sec under a pressure of from −5 kPa (gage) to 5 MPa. For use at higher temperatures, ceramic filters of tube, candle and honeycomb types are currently under development, but those for use in the temperature range of 450–650° C. which is used in the invention are already in the stage of practical use. The honeycomb-type filter has the particular advantage that it provides a sufficiently large filtration area per unit volume to enable the fabrication of the filter unit in a small size. A problem with this type of filter is that if the diameter of honeycomb cells is small, the chance of the bridge formation will increase, causing the need to perform frequent backwashing. If such a problem is anticipated, a system capable of reducing the load on the filter will be necessary and the combination of the aforementioned gasifying and melting furnaces will be effective. Needless to say, this system is also effective in the case of municipal wastes having a high ash content.

If the honeycomb-type filter is used to remove the aforementioned copper chloride ($CuCl_2$) and copper oxide (CuO) to a fine dust level, the potential of dioxin resynthesis at the latter stage can be reduced to an infinitesimally small level.

The ceramic filters for use in the invention may be made of alumina-based compounds such as mullite and cordierite, or highly corrosion-resistant titanium dioxide. For operations in a reducing atmosphere, filters made of highly corrosion-resistant non-oxide base ceramics such as silicon carbide and silicon nitride may be used if catalysts such as vanadium pentoxide and platinum are supported on the surfaces of the ceramic filters, not only the dust component in the combustion gas but also nitrogen oxides and dioxins can be reduced.

The thus treated dust-free combustion gas or combustible not only is of low corrosive nature, but also the potential of "ash cut", or wear by dust, is sufficiently reduced to achieve a significant increase in the gas flow rate of the combustion gas or combustible gas inside a heat exchanger. As a result, the pitch of heat transfer pipes can be reduced and yet the heat transfer coefficient that can be achieved is improved, whereby the size of the heat exchanger is sufficiently reduced to realize a substantial decrease in the initial investment.

If combustion or gasification of the waste is performed under pressure and dust removal in the temperature range of 450–650° C., followed by introduction of the hot combustion gas or combustible gas into a gas turbine, a combined cycle power generation is realized, leading to high-efficiency power recovery.

The present invention will now be described in greater detail with reference to the accompanying drawings.

FIG. 1 is a flow sheet for a heat recovery system involving reburning in one embodiment of the invention. A combustion furnace 1 is supplied with municipal wastes 10, which are combusted to generate a combustion exhaust gas. The gas is then supplied to a waste heat boiler 2, where it is cooled to 450–650° C. by heat exchange with heated water 19 coming from an economizer 6. Recovered from the waste heat boiler 2 is saturated steam 20 having a temperature of about 300° C. and a pressure of about 80 kgf/cm$^2$. Subsequently, the combustion exhaust gas is filtered in a temperature range of 450–650° C. at a filtration velocity of 1–5 cm/sec under a pressure of from −5 kPa (gage) to +2 kPa (gage) by means of a medium-temperature filter 3. In addition to the feed waste, the combustion furnace 1 may be charged with a neutralizing agent 13 such as limestone for absorbing HCl in the combustion exhaust gas. If necessary, a neutralizing agent 13 such as slaked lime may be introduced into a flue 12 connecting to the filter so as to remove directly from HCl the exhaust gas. Stream 14 which is part or all of the combustion exhaust gas exiting the medium-temperature filter 3 is supplied to a heating furnace 4, where it is reburnt to a higher temperature with an auxiliary fuel 15. The thus heated exhaust gas 16 is sent to a steam superheater 5, where saturated steam 20 coming from the waste heat boiler 2 is superheated to about 500° C. The combustion exhaust gas 17 goes to the economizer 6 and an air preheater 7 for heat recovery. Thereafter, the exhaust gas passes through an induced blower 8 and is discharged from a stack 9. The steam 21 superheated in the steam superheater 5 is sent to a steam turbine 22 for generating electricity 28.

If the saturated steam 20 is directed into the waste heat boiler 2 where the exhaust gas temperature is below about 600° C. such that such steam is heated to a temperature about 400° C., saving of the auxiliary fuel 15 can be accomplished.

Denoted by 11 and 18 in FIG. 1 are noncombustibles and water.

Figure 2:
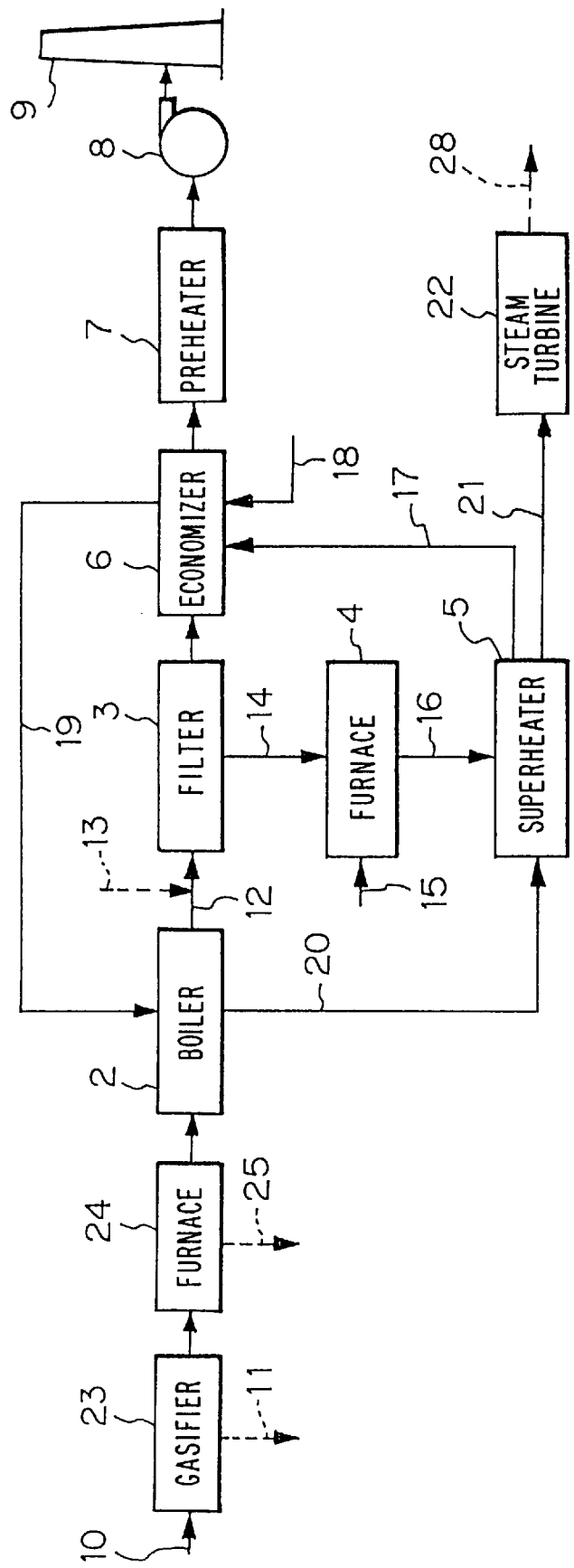
FIG. 2 is a flow sheet for a heat recovery system employing the combination of gasification and slagging combustion with reburning in another embodiment of the invention.

FIG. 2 is a flow sheet for a heat recovery system employing reburning combined with gasification and slagging or combustion to insure complete combustion. As shown, municipal wastes 10 are gasified in a gasifier or gasification furnace 23 to generate a combustible gas, which is oxidized at high temperature in a subsequent melting furnace 24 together with char, whereby unburnt solids are decomposed and resultant ash content is converted to molten slag 25. The hot combustion gas is fed into a waste heat boiler 2, where it is cooled to 450–650° C. with heated water 19 coming from economizer 6, thereby recovering saturated steam 20 having a temperature of about 300° C. and a pressure of about 80 kg f/CM$^2$. Subsequently, the combustion gas is supplied to a medium-temperature filter 3 for dust filtration in a temperature range of 450–650° C. at a filtration velocity of 1–5 cm/sec under a pressure of from −5 kPa (gage) to +2 kPa (gage). A neutralizing agent 13 such as slaked lime is introduced into a flue 12 connecting to the medium-temperature filter 3 so that the HCl in the combustion gas is removed by absorption. Stream 14 which is part or all of the combustion gas exiting the medium-temperature filter 3 is supplied to a heating furnace 4, where it is reburnt with an auxiliary fuel 15 and thereby heated to a higher temperature. The thus heated combustion gas 16 is directed to a steam superheater 5, where the saturated steam 20 coming from the waste heat boiler 2 is superheated to about 500° C. The combustion gas 17 exiting the steam superheater 5 goes to the economizer 6 and an air heater 7 for further heat recovery. Thereafter, the combustion gas passes through an induced blower 8 and is discharged from a stack 9.

The steam 21 superheated in the steam superheater 5 is sent to a steam turbine 22 for generating electricity 28. The auxiliary fuel can be saved by the same method as described in connection with the system shown in FIG. 1.

Denoted by 11 and 18 in FIG. 2 are noncombustibles and water.

Figure 3:
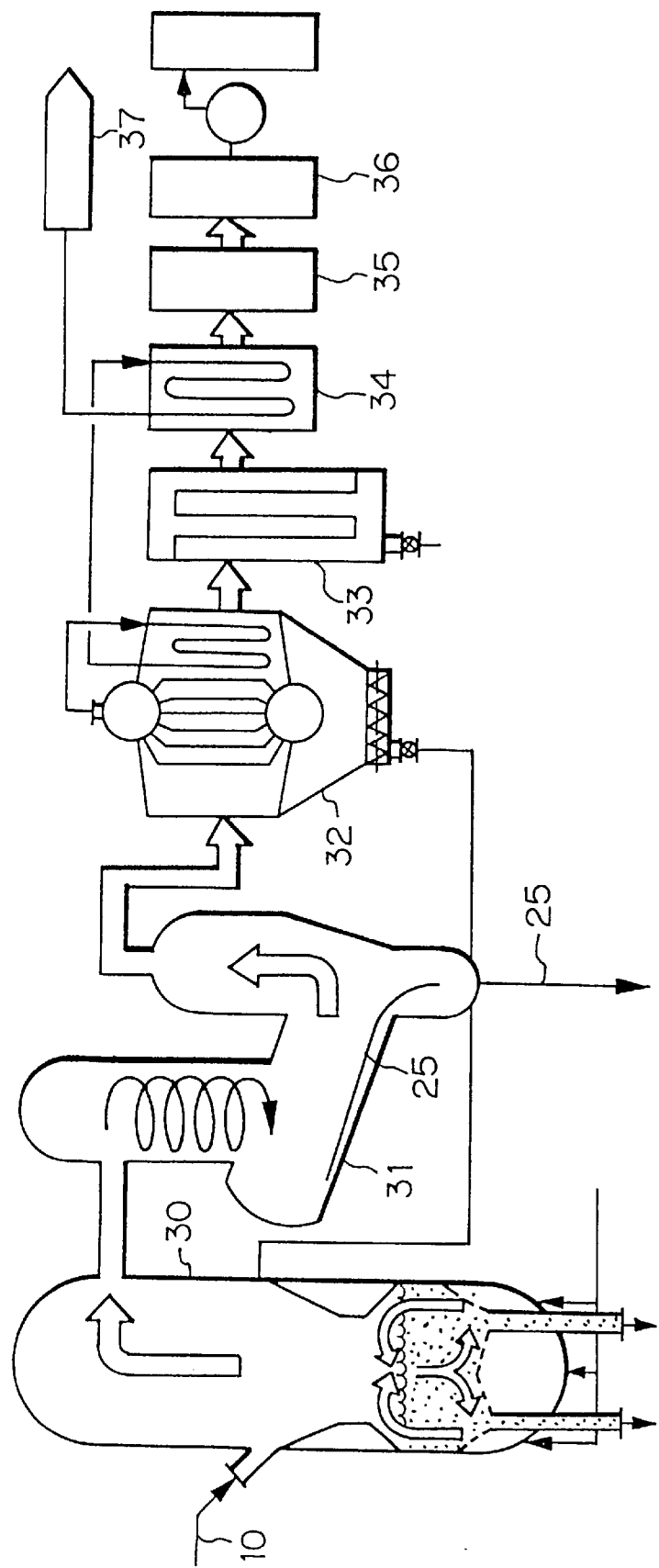
FIG. 3 is a flow sheet for a heat recovery system employing the combination of fluidized-bed gasification and slagging combustion with reburning by the firing of a combustible gas in accordance with yet another embodiment of the invention.

FIG. 3 is a flow sheet for a heat recovery system employing the combination of fluidized-bed gasification and slagging gasification with reburning by firing of a combustible gas in accordance with yet another embodiment of the invention.

A fluidized-bed gasification furnace 30 employs a small air ratio and the temperature of the fluidized bed is held as low as 450–650° C. such that the gasification reaction will proceed at a sufficiently slow rate to produce a homogeneous gas. In a conventional incinerator, the combustion temperature is so high that aluminum (m.p. 660° C.) will melt and be carried with the exhaust gas as fly ash, whereas iron and copper are oxidized so that they have only low commercial value when recycled. In contrast, the fluidized-bed gasification furnace 30 has a sufficiently low fluidized-bed temperature and yet has a reducing atmosphere so that metals such as iron, copper and aluminum can be recovered in an unoxidized and unadulterated state with the combustible material having been gasified, such that the ash metals are suitable for material recycling.

A swirl melting furnace 31 has vertical primary combustion chamber, an inclined secondary combustion chamber and a slag separating section. A char-containing gas blown into the furnace is burnt at high temperature while it swirls together with combustion air, whereas molten slag 25 on the inside surface of the furnace wall flows into the secondary combustion chamber and thence flows down the inclined bottom surface. In the slag separating section, a radiation plate maintains the slag temperature and thereby enables a consistent slag flowout 25.

Thus, the combustible gas and char that have been generated in the gasification furnace 30 are gasified at a high temperature of about 1,350° C., and thresh content thereby is converted to molten slag while ensuring complete decomposition of dioxins and the like.

The hot gas from the melting furnace 31 enters a waste heat boiler 32; such hot gas contains unburnt gases such as hydrogen and methane and is cooled to 450–650° C. in boiler 32, whereby steam is recovered. Thereafter, the gas is passed through a medium-temperature filter 33 to remove dust such as solidified salts in a temperature range of 450–650° C. at a filtration velocity of 1–5 cm/sec under a pressure of from −5 kPa (gage) to +2 kPa (gage). The dust-free gas then enters a heater 34 which is supplied with air, oxygen or the like to reburn the gas without feed of external fuel. It should be noted that the applicability of the method shown in FIG. 3 is limited to wastes 10 having a high heat value.

Denoted by 35, 36 and 37 respectively are an economizer, an air preheater and a steam turbine for high efficiency power generation.

Figure 4:
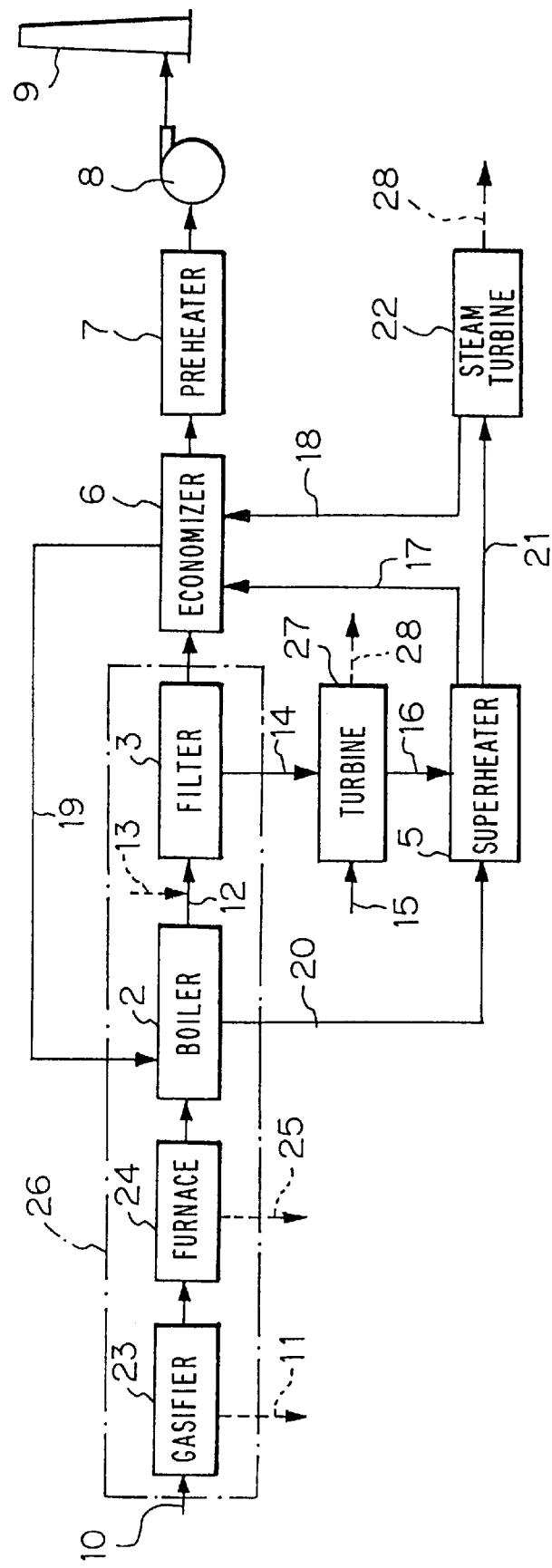
FIG. 4 is a flow sheet for a combined cycle power generation plant employing a two-stage gasifying system in accordance with a further embodiment of the invention.
Figure 5:
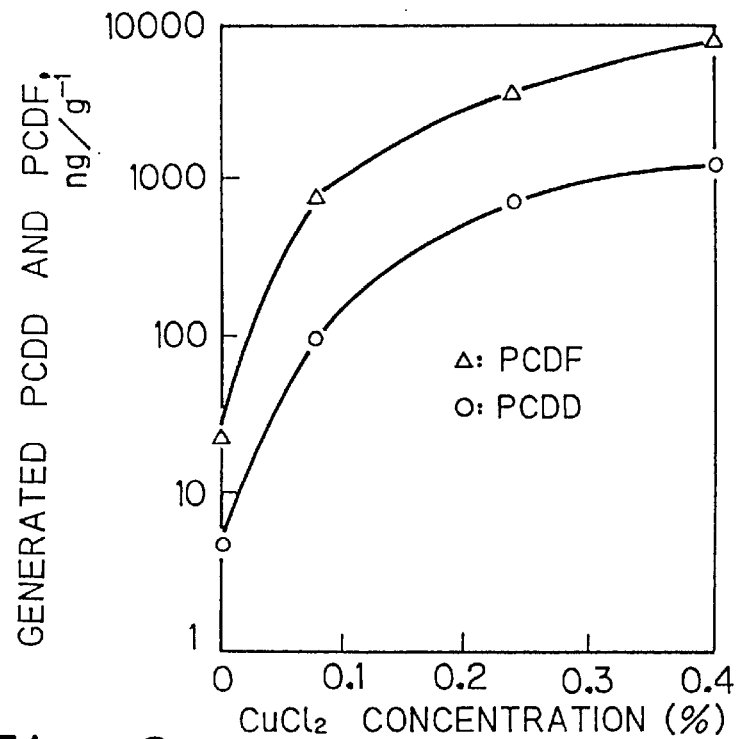
FIG. 5 is a graph showing the influence of $CuCl_2$ concentration on the generation of PCDD and PCDF concentrations.
Figure 6:
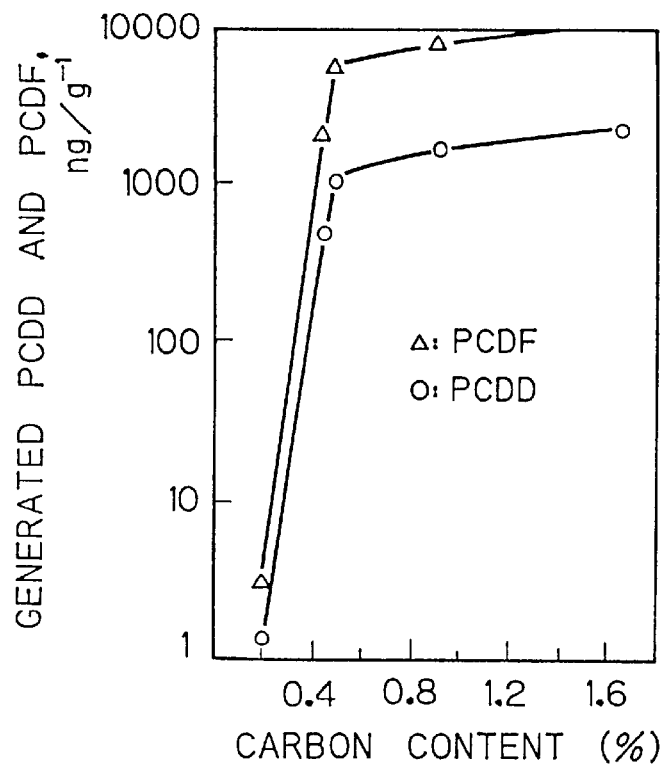
FIG. 6 is a graph showing PCDD and PCDF in fly ash as a function of unburnt carbon content.

FIG. 4 is a flow sheet for a combined cycle power plant employing gasification and slagging gasification in accordance with a further embodiment of the invention. As shown in FIG. 4, municipal wastes 10 are gasified in a gasifying furnace 23 to generate combustible gas which, together with char, is oxidized at high temperature in the subsequent melting furnace 24, where the ash content is converted to molten slag 25. The hot combustible gas is supplied to a waste heat boiler 2, where it is cooled to 450–650° C. by heat exchange with heated water 19 coming from an economizer 6 so as to recover saturated steam having a temperature of about 300° C. and a pressure of about 80 kgf/CM². The combustible gas is then passed through a medium-temperature filter 3 for dust filtration in a temperature range of 450–650° C. at a filtration velocity of 1–5 cm/sec under a pressure of from 102 kPa (gage) to 5 MPa. A neutralizing agent 13 such as slaked lime is introduced into a flue 12 connecting to the medium-temperature filter 3 such that the HCl in the gas is removed by absorption. All of the steps described up to here are performed within a pressure vessel 26. Stream 14 of the combustible gas exiting the filter 3 is supplied, together with combustion air 15, into a gas turbine 27 for generating electricity 28. Exhaust gas 16 from the gas turbine 27 is fed into a steam superheater 5, where the steam 20 coming from the waste heat boiler 2 is superheated to 500° C. and is thence supplied to the economizer 6 and an air preheater 7 for heat recovery. Thereafter, the exhaust gas is passed through an induced blower 8 and discharged from a stack 9. The steam 21 exiting the steam superheater 5 is sent to a steam turbine 22 for generating electricity 28.

Denoted by 18 in FIG. 4 is water.

FIG. 7 is a flow sheet for a test plant, with test data included, that was operated to evaluate the effectiveness of a medium-temperature filter in preventing the corrosion of heat transfer pipes while suppressing dioxin (DXN) resynthesis.

When the medium-temperature filter 13 was to be used, it was in the form of a honeycomb filter made of an alumina-based ceramic material and the combustion gas was passed through this filter to remove dust at 500° C.

When no medium-temperature filter was used, the steam temperature was 500° C. and the service life of the heat transfer pipes in the steam superheater 5 was 2,000 hours. By allowing the combustion gas having a temperature of 900° C. to pass through a radiation boiler 2, the DXN concentration was reduced by about 35%. On the other hand, passing through the steam superheater+boiler (5+2), economizer 6 and air preheater 7, resulted in DXN being resynthesized to have its concentration increased to at least 200 ng. TEQ/Nm³. Therefore, the DXN was removed together with dust by passage through a bag filter 38 and a scrubber 39 before the combustion gas was discharged from a stack 9.

When the medium-temperature filter 3 was used, the steam temperature was 500° C. and the service life of the heat transfer pipes in the steam superheater 5 was 4,000 hours, accompanied by a 0.1 mm reduction in pipe thickness. There was no detectable DXN resynthesis.

If one attempts to increase the steam temperature with a view to improving the efficiency of power generation by a steam turbine, corrosion by molten salts and the like in the combustion gas is accelerated in a heat transfer pipe of a temperature in excess of about 400° C. and, hence, the steam temperature must be heated below 400° C.

In contrast, by using the medium-temperature filter to remove the molten salts in the combustion gas or combustible gas before it enters the steam superheater, the corrosion of the heat transfer pipes is sufficiently suppressed that the steam temperature can be raised to about 500° C., thereby improving the efficiently of power generation.

In accordance with the present invention, the salts in a combustion gas or combustible gas are removed by performing dust filtration at a temperature of 450–650° C. which enables the solidification of molten salts. Therefore, the dust-free combustion gas or combustible gas can be sufficiently reburnt and heated without causing the corrosion of heat transfer pipes in a superheater. This contributes to an improvement in the efficiently of power generation using combustion gases produced by burning municipal waste and/or RDF.

If this technology is combined with a dechlorination method using neutralizing agents, the corrosive nature of such combustion gases or combustible gases can be further reduced by a significant degree. In addition, the resynthesis of dioxins can be suppressed.

We claim:

1. An apparatus for recovering heat and generating power from wastes, said apparatus c rising:

a gasifier for gasifying wastes at a low temperature and thereby produce combustible gas;

a burner for burning the combustible gas at high temperature to produce combustion gas containing at least one of alkali metal chlorides, calcium chloride, copper oxide and copper chloride;

a waste heat boiler for cooling the combustion gas and for producing steam;

a dust filter for filtering the thus cooled combustion gas at a temperature of from 450–650° C. to thereby remove therefrom the alkali metal chlorides, calcium chloride, copper oxide and copper chloride as solid materials;

a furnace for reburning the thus filtered combustion gas with auxiliary fuel to thereby reheat the combustion gas to a temperature sufficient to permit heat recovery therefrom;

a steam superheater to receive the thus reheated combustion gas and the steam and to superheat the steam by recovery of heat from the combustion gas; and a steam turbine to receive the thus superheated steam and thereby to generate power.

2. An apparatus as claimed in claim 1, wherein said dust filter comprises a ceramic filter.

3. An apparatus as claimed in claim 2, wherein said filter supports a denitration catalyst.

4. An apparatus as claimed in claim 1, wherein said filter supports a denitration catalyst.

5. An apparatus as claimed in claim 1, further comprising at least one of an economizer and a preheater to recover heat from combustion gas discharged from said steam superheater, and means for then discharging the gas to the atmosphere.

6. An apparatus as claimed in claim 1, further comprising means for introducing neutralizing agent into at least one of the wastes and the combustion gas prior to filtration by said dust filter.

* * * * *